United States Patent [19]
Rylander et al.

[11] 3,715,397
[45] Feb. 6, 1973

[54] PROCESS FOR PREPARING PARA-AMINOPHENOL

[75] Inventors: Paul N. Rylander, Newark; Irene M. Karpenko, Irvington; George R. Pond, Newark, all of N.J.

[73] Assignee: Engelhard Minerals & Chemicals Corporation

[22] Filed: April 16, 1970

[21] Appl. No.: 29,054

[52] U.S. Cl. .................................................260/575
[51] Int. Cl. .............................................C07c 91/44
[58] Field of Search.....................................260/575

[56] References Cited

UNITED STATES PATENTS

| | | | |
|---|---|---|---|
| 2,198,249 | 4/1940 | Henke et al. | 260/575 |
| 2,765,342 | 8/1956 | Spiegler | 260/575 |
| 3,383,416 | 5/1968 | Benner | 260/575 |

*Primary Examiner*—Lewis Gotts
*Assistant Examiner*—C. F. Warren
*Attorney*—Miriam W. Leff and Samuel Kahn

[57] ABSTRACT

In an improved process for preparing aromatic hydroxyamines by the selective hydrogenation of aromatic nitro compounds and rearrangement in the presence of a platinum group metal catalyst and dilute sulfuric acid, the hydrogenation is carried out in the presence of dimethylsulfoxide.

1 Claim, 1 Drawing Figure

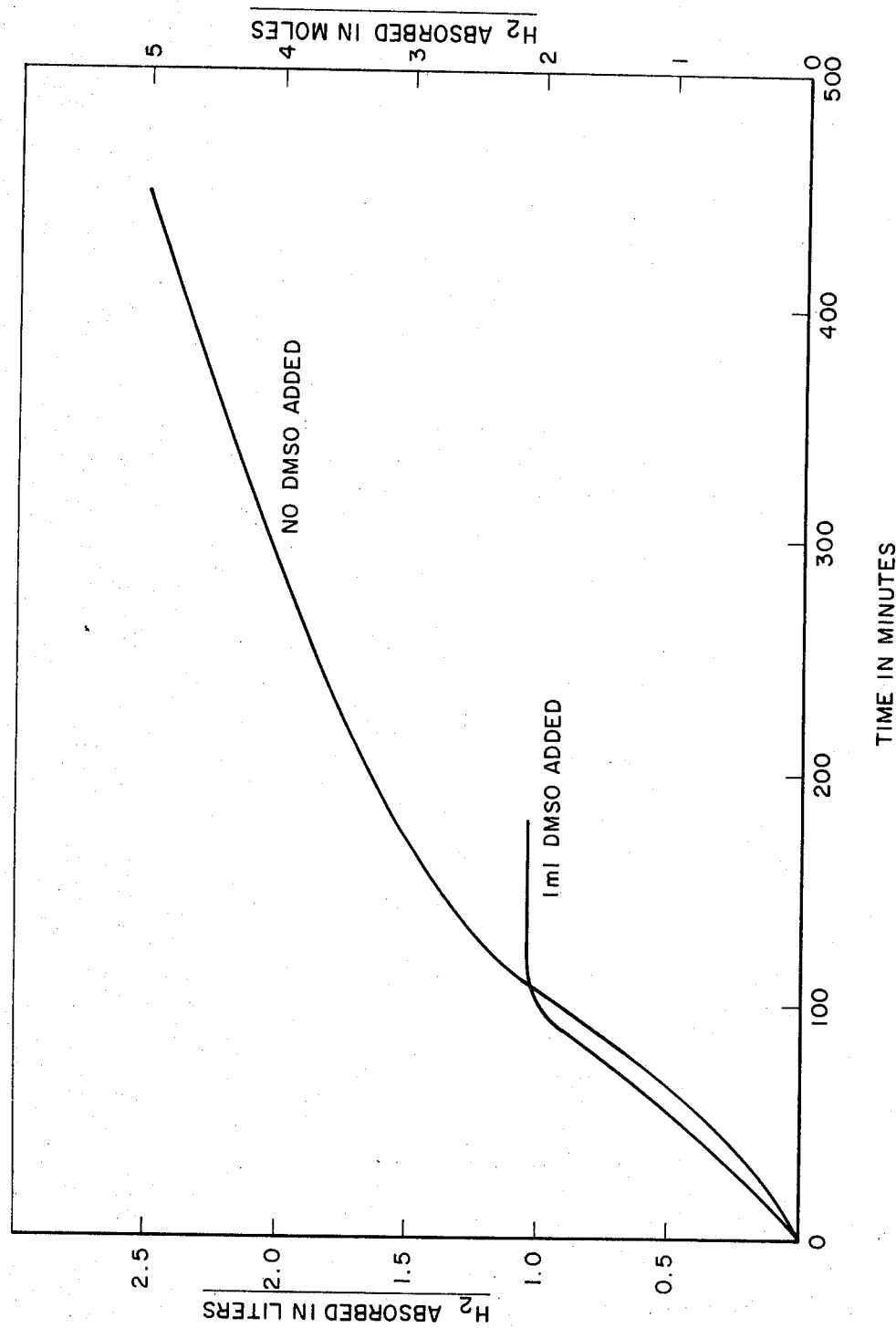

PROCESS FOR PREPARING PARA-AMINOPHENOL

BACKGROUND OF THE INVENTION

Aromatic hydroxyamines are generally a commercially important class of compounds. They are used extensively in the manufacture of dyes, antioxidants, photographic developers as well as other commercial products. A typical member of this class of compounds is p-aminophenol. The production of the aromatic hydroxyamines from the corresponding nitro compounds, e.g. aminophenols from nitrobenzenes, is well known. Most recent methods involve the hydrogenation in dilute acid, e.g. sulfuric acid, in the presence of a platinum group metal. Such process involves the reduction of the nitro compound to the hydroxylamine followed by rearrangement, without isolation of the intermediate product. Using nitrobenzene as the prototype, the reactions can generally be represented as follows.

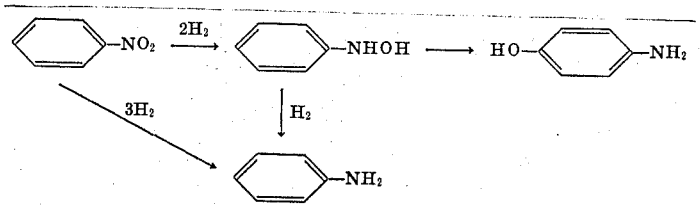

This reaction has been investigated thoroughly. It has been found that the yield is sensitive to acid concentration, catalyst, temperature, hydrogen pressure, mode of addition, and the presence of water-soluble quaternary ammonium compounds. Satisfactory yields of p-aminophenol have been reported using the process of U.S. Pat. No. 2,765,342, which requires the use of reduced hydrogen pressure and carefully controlled addition of the substrate. Variation from the low pressure and/or rate of addition cause relatively large changes in the yield and quality of the product. It has been found, for example, using the process of U.S. Pat. No. 2,765,342 that the yield of p-aminophenol approached 100 percent at 100 mm hydrogen pressure, fell to 50 percent at 500 mm, and was negligible at atmospheric pressure. Also, the accidental addition of excess nitrobenzene or cessation of the addition causes troublesome changes in the rate or in the formation of unwanted by-products. Clearly it would be more practical to operate at one atmosphere of hydrogen and using a system less sensitive to the rate of addition of the substrate.

Another problem associated with past methods of obtaining the aromatic hydroxyamines by this method is that the amount of hydrogen absorbed had to be carefully controlled. That is, the reaction had to be stopped either prior to the complete reaction of the substrate as disclosed in U.S. Pat. No. 3,383,416, or just on the absorption of 2 equivalent moles of hydrogen, as is obvious from the equations above which represent the reactions in the system. Since there is substantially no change in rate in the hydrogen absorbed in past methods, it will be appreciated that many practical problems are associated with stopping the reaction at the optimum stage of hydrogen absorption.

It is thus an object of the present invention to provide an improved process for the production of aromatic hydroxyamines by the selective catalytic hydrogenation route described above. It is a particular object of this invention to provide such process operable at one atmosphere of hydrogen. It is a further object to provide a process in which there is a cessation in the absorption of hydrogen, or at least a substantial drop in the hydrogenation rate, when two molar equivalents of hydrogen are absorbed, thereby facilitating the production of the aromatic hydroxyamines in good yields.

It has now been found that these and other objects can be accomplished by carrying out the processes in the presence of a selectivity agent, as described below.

SUMMARY OF THE INVENTION

Briefly in accordance with this invention there is provided an improved process for preparing aromatic hydroxyamines by the selective hydrogenation of nitro compounds and rearrangement in the presence of a platinum group metal catalyst and dilute acid, which comprises carrying out the reaction in the presence of dimethylsulfoxide (DMSO).

The selectivity agent is the DMSO. It has been found that even small additions of DMSO to the reaction mixture have a potent effect on the selectivity of the hydrogenation. While the amount of DMSO that can be employed can be varied considerably, there is a limiting value beyond which added amounts of DMSO have relatively little effect. Preferably the DMSO is present in an amount of about 0.1 mole to 100 moles per mole of catalyst metal.

It has been found that in the presence of the DMSO the reaction can be carried out at one atmosphere hydrogen pressure to produce the aromatic hydroxyamines in good yields. A marked effect of the DMSO is that the hydrogen absorption ceases abruptly slightly in excess of two equivalent moles of hydrogen.

THE DRAWING

The material effect of DMSO on the rate of hydrogenation is shown in the accompanying graph in which the amount of hydrogen absorbed, given in liters and moles, is plotted against time.

In the experiment represented by the graph comparative runs were made in which nitrobenzene in 25 percent aqueous sulfuric acid was contacted with hydrogen at one atmosphere in the presence of platinum oxide as catalyst. One test was run in accordance with the prior art, i.e. without DMSO. A comparative test was made with 1 ml DMSO added. The graph shows that without DMSO hydrogen absorption continues past 5 moles, whereas with DMSO present hydrogen absorption ceases abruptly slightly in excess of 2 moles. This measurement indicates rearrangement to aminophenol has occurred. As shown in the examples below, aminophenol is formed in substantial yield by this process.

DETAILED DESCRIPTION OF THE EMBODIMENTS

As indicated above, this invention is generally applicable to the known processes involving the selective reduction and rearrangement of aromatic nitrocompounds to form aromatic hydroxyamines. The aromatic nitrocompounds which may be employed in such processes will be obvious to those skilled in the art. Typically the aromatic nitro compounds are nitrobenzene and nitronaphthalene and suitable derivatives thereof. With respect to the derivative compounds, the process is applicable to mononitro and dinitro aromatics, but mono derivatives are preferred. Dinitro compounds, as 2, 4-dinitrotoluene, give a mixture or products. Aromatic nitro compounds having other easily reduced groups, as 4-nitrostyrene, undergo secondary changes and produce 4-ethyl-N-phenylhydroxylamine, and/or 4-ethyl-2-hydroxyaniline. Compounds, like 3-nitroacetophenone, with functions reactive to hydroxylamines may yield condensation products. Examples of derivative compounds suitable as substrates for our invention are alkyl substituted aromatic nitro compounds, as 4-nitrotoluene, 3-nitroethylbenzene, 2-methyl-4-nitrotoluene; halonitroaromatics as 3-chloronitrobenzene, 4-fluoronitrobenzene, and 5-chloro-1-nitronaphthalene; aminonitroaromatics, as 4-aminonitrobenzene, 3-N-methylaminonitrobenzene, and 4-N,N-dimethylamino-nitrobenzene; aromatic nitronitriles, as 3-nitrobenzonitrile, and 4-nitrobenzylcyanide; aromatic alcohols, as 3-nitro-1-phenylethanol, 4-nitro-2-phenylethanol, and 4-nitrobenzyl alcohol; aromatic nitrophenols as, 4-nitrophenol and 3-nitro-5-methylphenol; aromatic nitro ethers, as 2-nitroanisole and 3-nitrophenetole. It will be obvious, that the substrate is selected according to the desired end product. If for example a parahydroxyamine is the desired product, it will be necessary for the position in the aromatic nucleus which is para to the nitro group to be unsubstituted. Reference to U.S. Pat. No. 2,765,342 and U.S. Pat. No. 2,198,249 will show further examples of the type of nitro compounds to which this invention is applicable.

It is known to use platinum group metal catalysts, such as platinum and palladium, for this process. Generally, the catalysts have been used supported, e.g. in the amount of about 0.1 to 20 percent on a suitable support such as carbon. Other platinum group metals, e.g. rhodium, iridium, and ruthenium may be used. Other suitable supports include alpha-alumina, barium sulfate, and kieselguhr. Preferably the catalyst is platinum, which may be used supported, unsupported, and in combination with other precious metals, e.g. palladium, rhodium, iridium, ruthenium, and gold. It has been found that platinum in the form of an oxide is particularly suitable as the catalyst in this process. The catalysts can be used repeatedly. Catalysts suitable for this process are commercially available. Also, they can be produced by well known methods. For example, one method of preparing a suitable platinum oxide catalyst is given in ORGANIC SYNTHESIS, 2nd Ed., Collective Vol. I, N.Y., John Wiley & Sons (1932), at page 463.

Generally, the catalyst metal is present in the reaction mixture in an amount of from about 0.01 to 20 percent, based on the weight of the substrate, preferably 0.5 to 5 percent. When less than about 0.01 percent of the catalyst metal is used, the rate is too low to be practical; and at concentrations above about 5 percent, the small increase in rate does not justify the additional cost.

The selective reduction is carried out in preferably dilute sulfuric acid. It is known that the acid concentration affects the product yield and rate. Suitably this process is carried out at acid concentrations of 1 to 40 percent sulfuric acid in water, and preferably about 25 percent at room temperature and lower concentrations at higher temperatures. The acid should be more dilute as the temperature is raised. Conditions under which the acid becomes oxidizing and sulfonating should be avoided. Reduced acid is a catalyst poison. About 25 percent acid is convenient at room temperature; at elevated temperature the rearrangement is faster and such concentrated acid is not needed. The amount in moles of acid should be at least equal to the amount in moles of substrate and preferably an excess of acid is used.

It is believed that phosphoric acid can be substituted for sulfuric, but there is no advantage to its use and it is more expensive.

The process is operated batchwise or continuously, using standard equipment. The hydrogenation may be carried out conveniently at ambient temperature and at atmospheric pressure. In fact it is an advantage of the present process that the reaction can be carried out at such mild conditions. However, it will be appreciated that, depending on the substrate the conditions of operation can be optimized, as is well known to those skilled in the art. Generally more efficient use is made of the catalyst as the pressure and temperature are raised but when the hydrogenation rate for third mole absorption increases faster than the rearrangement rate the yield of aminophenol will fall and the yield of aniline increase. It will be appreciated that the conditions closest to ambient which achieve the desired result at a suitable rate are used advantageously.

Typically, within the framework of the discussion above, the reaction may be carried out at a temperature in the range of about 0° to 150° C. and preferably between about 25° to 75° C. Hydrogen pressures from about 0.1 atm to 100 atm may be used. It is, of course more convenient to operate at or above 1 atmosphere and no advantage is seen in using pressures higher than about 100 psig, thus Thus permitting the use of low pressure equipment.

Operating under the above conditions, including the presence of the DMSO, the reaction proceeds until roughly two molar equivalents of hydrogen are absorbed. At this point the reaction ceases or the rate of hydrogenation slows down substantially. In the hydrogenation of nitrobenzene, it has been found that the reaction ceases abruptly when slightly in excess of 2 equivalent moles of hydrogen have been absorbed. Contrastingly, without DMSO the rate is substantially constant over the absorption of 5 moles of hydrogen. The marked change in rate after the absorption of two moles of hydrogen is of significant practical value in this process in obtaining maximum product recovery.

The following representative examples illustrate the invention.

EXAMPLE 1

In comparative test, two one liter glass flasks were used each charged with 2 ml of nitrobenzene, 75 ml of water, 25 ml of concentrated $H_2SO_4$, and 100 mg. of $PtO_2$. In one experiment no DMSO was added, and in the comparative experiment 1 ml. of DMSO was added. The reductions were carried out at room temperature with the hydrogen pressure at one atmosphere and with the flasks vigorously shaken. The rate of hydrogen absorption was recorded. In the experiment with no DMSO, the absorption continued until 5 moles of hydrogen were absorbed. In the experiment run in accordance with this invention, i.e. with DMSO added, the rate of hydrogen absorption for the first two moles equaled that without DMSO, but ceased abruptly after slightly more than 2 moles of $H_2$ were absorbed.

EXAMPLE 2

A test run was carried out similarly to that described in EXAMPLE 1, except that the reaction mixture contained 10 ml. nitrobenzene, 75 ml. $H_2O$, 25 ml. conc. $H_2SO_4$, 300 mg. $PtO_2$ and 2 ml. DMSO. This mixture was shaken under one atmosphere of hydrogen pressure until 2 moles of hydrogen were absorbed. The reaction was then stopped, the catalyst removed by filtration, and solid sodium carbonate was added portionwise to the reaction mixture until the pH read by glass electrode, was 9.2. The resulting solid was filtered off and dried under vacuum to 5.9 g. Infrared analysis of the dried solid showed the material to be substantially p-aminophenol. Vapor phase chromatographic analysis indicated the solid to be 85 percent p-aminophenol and about 8 percent o-aminophenol together with 7 percent of an unidentified product. No aniline, nitrobenzene, phenylhydroxylamine or dimeric products were found.

EXAMPLE 3

A test run was carried out similarly to that described in Example 2 except that 500 mg. $PtO_2$ and 5 ml. DMSO were used. The overall yield of isolated aminophenol was 59.4 percent, of which 62 percent was the para isomer and 38 percent the ortho isomer.

Variations and modifications which will be obvious and apparent to those skilled in the art may be made in the invention without departing from the spirit and scope thereof.

What is claimed is:

1. In a process for the production of para-aminophenol wherein nitrobenzene is reduced with hydrogen in aqueous sulfuric acid reaction medium at a temperature of from about 0° to 150° C. and at a hydrogen pressure of about 0 to 100 psig in the presence of from 0.01 percent to 20 percent by weight, based on the weight of nitrobenzene, of platinum as platinum oxide, the improvement of adding to the reaction medium from 0.01 mole to 100 moles, per mole of platinum metal, of dimethylsulfoxide, effecting said reduction until hydrogen absorption is substantially complete and separating para-aminophenol from the reaction medium.

* * * * *